US012067688B2

(12) United States Patent
Goncalves et al.

(10) Patent No.: US 12,067,688 B2
(45) Date of Patent: Aug. 20, 2024

(54) COORDINATION OF INTERACTIONS OF VIRTUAL OBJECTS

(71) Applicant: Meta Platforms Technologies, LLC, Menlo Park, CA (US)

(72) Inventors: Miguel Goncalves, Redwood City, CA (US); Bret Hobbs, Moraga, CA (US); Lionel Laurent Reyero, Arlington, MA (US); Gabriel Barbosa Nunes, San Francisco, CA (US); Benjamin Blonder Leizman, New York, NY (US); Neil Anthony Clifford, Loughton (GB)

(73) Assignee: Meta Platforms Technologies, LLC, Menlo Park, CA (US)

( * ) Notice: Subject to any disclaimer, the term of this patent is extended or adjusted under 35 U.S.C. 154(b) by 73 days.

(21) Appl. No.: 17/670,946

(22) Filed: Feb. 14, 2022

(65) Prior Publication Data

US 2023/0260233 A1    Aug. 17, 2023

(51) Int. Cl.
*G06T 19/20* (2011.01)
(52) U.S. Cl.
CPC ........ *G06T 19/20* (2013.01); *G06T 2219/024* (2013.01)
(58) Field of Classification Search
CPC ..................... G06T 19/20; G06T 2219/024
See application file for complete search history.

(56) References Cited

U.S. PATENT DOCUMENTS 770,149 A    9/1904  Bailey
6,842,175 B1   1/2005  Schmalstieg et al.
(Continued)

FOREIGN PATENT DOCUMENTS

EP    2887322 B1    2/2020
WO   2018235371 A1   12/2018
(Continued)

OTHER PUBLICATIONS

Broitman A., "Learn and Do More with Lens in Google Images," Oct. 25, 2018, Retrieved from the Internet: URL: https://www.blog.google/products/search/learn-and-do-more-lens-google-images/ , 4 pages.

(Continued)

*Primary Examiner* — YuJang Tswei
(74) *Attorney, Agent, or Firm* — Potomac Law Group, PLLC; Dannon G. Allbee

(57) ABSTRACT

A virtual object system can coordinate interactions between multiple virtual objects in an artificial reality environment. Embodiments receive a first virtual object, the first virtual object including first properties, where the artificial reality environment is set in a real-world environment. Embodiments register the first properties of the first virtual object to receive notifications of events from the artificial reality environment. Embodiments receive one or more queries from a second virtual object and in response to the one or more queries, respond to the second virtual object with identified features of the real-world environment in which the artificial reality environment is set and identifications of one or more other virtual objects (e.g., the first virtual object). The second virtual object can use the identification of the first virtual object to register for events related to the first virtual object and/or communicate with the first virtual object.

20 Claims, 9 Drawing Sheets

(56) References Cited

U.S. PATENT DOCUMENTS

| | | |
|---|---|---|
| 7,650,575 B2 | 1/2010 | Cummins et al. |
| 7,701,439 B2 | 4/2010 | Hillis et al. |
| 8,335,991 B2 | 12/2012 | Douceur et al. |
| 8,558,759 B1 | 10/2013 | Prada Gomez et al. |
| 8,947,351 B1 | 2/2015 | Noble |
| 9,055,404 B2 | 6/2015 | Setlur et al. |
| 9,081,177 B2 | 7/2015 | Wong et al. |
| 9,117,274 B2 | 8/2015 | Liao et al. |
| 9,292,089 B1 | 3/2016 | Sadek |
| 9,477,368 B1 | 10/2016 | Filip et al. |
| 9,530,252 B2 | 12/2016 | Poulos et al. |
| 9,817,472 B2 | 11/2017 | Lee et al. |
| 10,127,290 B1 | 11/2018 | Armstrong et al. |
| 10,220,303 B1 | 3/2019 | Schmidt et al. |
| 10,248,284 B2 | 4/2019 | Itani et al. |
| 10,473,935 B1 | 11/2019 | Gribetz et al. |
| 10,521,944 B2 | 12/2019 | Sareen et al. |
| 10,713,831 B2 | 7/2020 | Arana et al. |
| 10,867,450 B2 | 12/2020 | Todeschini |
| 10,909,762 B2 | 2/2021 | Karalis et al. |
| 10,963,144 B2 | 3/2021 | Fox et al. |
| 11,023,096 B2 | 6/2021 | Schneider et al. |
| 11,087,029 B1 | 8/2021 | Satpathy |
| 11,087,529 B2 | 8/2021 | Yeung et al. |
| 11,126,320 B1 | 9/2021 | Thompson et al. |
| 11,132,066 B1 | 9/2021 | Blachly et al. |
| 11,132,827 B2 | 9/2021 | Gladkov et al. |
| 11,176,755 B1 | 11/2021 | Tichenor et al. |
| 11,238,664 B1 | 2/2022 | Tavakoli et al. |
| 2008/0089587 A1 | 4/2008 | Kim et al. |
| 2009/0313299 A1 | 12/2009 | Bonev et al. |
| 2010/0251177 A1 | 9/2010 | Geppert et al. |
| 2010/0306716 A1 | 12/2010 | Perez |
| 2011/0267265 A1 | 11/2011 | Stinson |
| 2012/0069168 A1 | 3/2012 | Huang et al. |
| 2012/0143358 A1 | 6/2012 | Adams et al. |
| 2012/0188279 A1 | 7/2012 | Demaine |
| 2012/0206345 A1 | 8/2012 | Langridge |
| 2012/0275686 A1 | 11/2012 | Wilson et al. |
| 2012/0293544 A1 | 11/2012 | Miyamoto et al. |
| 2013/0051615 A1 | 2/2013 | Lim et al. |
| 2013/0063345 A1 | 3/2013 | Maeda |
| 2013/0069860 A1 | 3/2013 | Davidson |
| 2013/0117688 A1 | 5/2013 | Yerli |
| 2013/0125066 A1 | 5/2013 | Klein et al. |
| 2013/0141419 A1 | 6/2013 | Mount et al. |
| 2013/0147793 A1 | 6/2013 | Jeon et al. |
| 2013/0169682 A1 | 7/2013 | Novak et al. |
| 2013/0265220 A1 | 10/2013 | Fleischmann et al. |
| 2014/0125598 A1 | 5/2014 | Cheng et al. |
| 2014/0149901 A1 | 5/2014 | Hunter |
| 2014/0236996 A1 | 8/2014 | Masuko et al. |
| 2014/0268065 A1 | 9/2014 | Ishikawa et al. |
| 2014/0357366 A1 | 12/2014 | Koganezawa et al. |
| 2014/0375683 A1 | 12/2014 | Salter et al. |
| 2014/0375691 A1 | 12/2014 | Kasahara |
| 2014/0378022 A1 | 12/2014 | Muthyala et al. |
| 2015/0015504 A1 | 1/2015 | Lee et al. |
| 2015/0035746 A1 | 2/2015 | Cockburn et al. |
| 2015/0054742 A1 | 2/2015 | Imoto et al. |
| 2015/0062160 A1 | 3/2015 | Sakamoto et al. |
| 2015/0077592 A1 | 3/2015 | Fahey |
| 2015/0094142 A1 | 4/2015 | Stafford |
| 2015/0153833 A1 | 6/2015 | Pinault et al. |
| 2015/0160736 A1 | 6/2015 | Fujiwara |
| 2015/0169076 A1 | 6/2015 | Cohen et al. |
| 2015/0181679 A1 | 6/2015 | Liao et al. |
| 2015/0206321 A1 | 7/2015 | Scavezze et al. |
| 2015/0220150 A1 | 8/2015 | Plagemann et al. |
| 2015/0253862 A1 | 9/2015 | Seo et al. |
| 2015/0261659 A1 | 9/2015 | Bader et al. |
| 2015/0356774 A1* | 12/2015 | Gal .......... G06F 30/00 345/633 |
| 2016/0026253 A1 | 1/2016 | Bradski et al. |
| 2016/0093108 A1 | 3/2016 | Mao et al. |
| 2016/0110052 A1 | 4/2016 | Kim et al. |
| 2016/0147308 A1 | 5/2016 | Gelman et al. |
| 2016/0170603 A1 | 6/2016 | Bastien et al. |
| 2016/0173359 A1 | 6/2016 | Brenner et al. |
| 2016/0180590 A1 | 6/2016 | Kamhi et al. |
| 2016/0378291 A1 | 12/2016 | Pokrzywka |
| 2017/0060230 A1 | 3/2017 | Faaborg et al. |
| 2017/0075420 A1 | 3/2017 | Yu et al. |
| 2017/0076500 A1* | 3/2017 | Maggiore .......... G06F 3/04845 |
| 2017/0109936 A1 | 4/2017 | Powderly et al. |
| 2017/0139478 A1 | 5/2017 | Jeon et al. |
| 2017/0192513 A1 | 7/2017 | Karmon et al. |
| 2017/0206691 A1 | 7/2017 | Harrises et al. |
| 2017/0214782 A1 | 7/2017 | Brinda |
| 2017/0242675 A1 | 8/2017 | Deshmukh |
| 2017/0243465 A1 | 8/2017 | Bourne, Jr. et al. |
| 2017/0262063 A1 | 9/2017 | Blenessy et al. |
| 2017/0278304 A1 | 9/2017 | Hildreth et al. |
| 2017/0287225 A1 | 10/2017 | Powderly et al. |
| 2017/0296363 A1 | 10/2017 | Yetkin et al. |
| 2017/0311129 A1 | 10/2017 | Lopez-Uricoechea et al. |
| 2017/0323488 A1* | 11/2017 | Mott .......... G06Q 30/0643 |
| 2017/0364198 A1 | 12/2017 | Yoganandan et al. |
| 2017/0372225 A1 | 12/2017 | Foresti |
| 2018/0005429 A1 | 1/2018 | Osman et al. |
| 2018/0059901 A1 | 3/2018 | Gullicksen |
| 2018/0075659 A1 | 3/2018 | Browy et al. |
| 2018/0091304 A1 | 3/2018 | Brook et al. |
| 2018/0095616 A1 | 4/2018 | Valdivia et al. |
| 2018/0107278 A1 | 4/2018 | Goel et al. |
| 2018/0113599 A1 | 4/2018 | Yin |
| 2018/0189647 A1 | 7/2018 | Calvo et al. |
| 2018/0288391 A1 | 10/2018 | Lee et al. |
| 2018/0293802 A1* | 10/2018 | Hendricks .......... G09B 23/30 |
| 2018/0300557 A1 | 10/2018 | Rodenas et al. |
| 2018/0307303 A1 | 10/2018 | Powderly et al. |
| 2018/0322701 A1 | 11/2018 | Pahud et al. |
| 2018/0329718 A1 | 11/2018 | Klein et al. |
| 2018/0335925 A1 | 11/2018 | Hsiao et al. |
| 2018/0357780 A1 | 12/2018 | Young et al. |
| 2019/0005724 A1 | 1/2019 | Pahud et al. |
| 2019/0094981 A1 | 3/2019 | Bradski et al. |
| 2019/0107894 A1 | 4/2019 | Hebbalaguppe et al. |
| 2019/0114061 A1 | 4/2019 | Daniels et al. |
| 2019/0155481 A1* | 5/2019 | DiVerdi .......... G06T 19/20 |
| 2019/0172262 A1 | 6/2019 | McHugh et al. |
| 2019/0197785 A1* | 6/2019 | Tate-Gans .......... G06T 19/006 |
| 2019/0213792 A1* | 7/2019 | Jakubzak .......... G06F 3/017 |
| 2019/0236842 A1* | 8/2019 | Bennett .......... G06Q 10/10 |
| 2019/0258318 A1 | 8/2019 | Qin et al. |
| 2019/0278376 A1 | 9/2019 | Kutliroff et al. |
| 2019/0279424 A1* | 9/2019 | Clausen .......... G06F 3/017 |
| 2019/0279426 A1* | 9/2019 | Musunuri .......... G06V 20/20 |
| 2019/0279430 A1* | 9/2019 | Todeschini .......... G09G 3/001 |
| 2019/0286231 A1 | 9/2019 | Burns et al. |
| 2019/0317965 A1 | 10/2019 | Remis et al. |
| 2019/0340833 A1* | 11/2019 | Furtwangler .......... G06F 3/011 |
| 2019/0362562 A1 | 11/2019 | Benson |
| 2019/0369391 A1 | 12/2019 | Cordesses et al. |
| 2019/0377406 A1 | 12/2019 | Steptoe et al. |
| 2019/0377416 A1 | 12/2019 | Alexander |
| 2020/0066047 A1 | 2/2020 | Karalis et al. |
| 2020/0082629 A1 | 3/2020 | Jones et al. |
| 2020/0097077 A1 | 3/2020 | Nguyen et al. |
| 2020/0097091 A1 | 3/2020 | Chou et al. |
| 2020/0174584 A1 | 6/2020 | Schliemann et al. |
| 2020/0210127 A1 | 7/2020 | Browy |
| 2020/0218423 A1 | 7/2020 | Ohashi |
| 2020/0219319 A1 | 7/2020 | Lashmar et al. |
| 2020/0225736 A1 | 7/2020 | Schwarz et al. |
| 2020/0225758 A1 | 7/2020 | Tang et al. |
| 2020/0226814 A1 | 7/2020 | Tang et al. |
| 2020/0226820 A1* | 7/2020 | Stachniak .......... G06T 19/20 |
| 2020/0285761 A1 | 9/2020 | Buck et al. |
| 2020/0285977 A1 | 9/2020 | Brebner |
| 2020/0351273 A1 | 11/2020 | Thomas |
| 2020/0363924 A1 | 11/2020 | Flexman et al. |
| 2020/0363930 A1 | 11/2020 | Srinivasan et al. |
| 2021/0012113 A1 | 1/2021 | Petill et al. |

(56) References Cited

U.S. PATENT DOCUMENTS

| | | |
|---|---|---|
| 2021/0014408 A1 | 1/2021 | Timonen et al. |
| 2021/0097768 A1 | 4/2021 | Malia et al. |
| 2021/0104100 A1 | 4/2021 | Whitney et al. |
| 2021/0192856 A1 | 6/2021 | Lee |
| 2021/0256769 A1 | 8/2021 | Bailey et al. |
| 2021/0272375 A1 | 9/2021 | Lashmar et al. |
| 2021/0295602 A1 | 9/2021 | Scapel et al. |
| 2021/0306238 A1 | 9/2021 | Cheng et al. |
| 2021/0358201 A1 | 11/2021 | Cady et al. |
| 2021/0390765 A1 | 12/2021 | Laaksonen et al. |
| 2022/0084279 A1 | 3/2022 | Lindmeier et al. |
| 2022/0091722 A1 | 3/2022 | Faulkner et al. |
| 2022/0101612 A1 | 3/2022 | Palangie et al. |
| 2022/0121344 A1 | 4/2022 | Pastrana Vicente et al. |
| 2022/0139052 A1 | 5/2022 | Tavakoli et al. |
| 2022/0254120 A1 | 8/2022 | Berliner et al. |
| 2022/0269888 A1 | 8/2022 | Stoeva et al. |
| 2022/0326967 A1 | 10/2022 | Khan et al. |
| 2022/0392093 A1 | 12/2022 | Poulad et al. |
| 2023/0050933 A1 | 2/2023 | Xiao et al. |

FOREIGN PATENT DOCUMENTS

| | | |
|---|---|---|
| WO | 2020226832 A1 | 11/2020 |
| WO | 2022055822 A1 | 3/2022 |

OTHER PUBLICATIONS

Hincapie-Ramos J.D., et al., "GyroWand: IMU-Based Raycasting for Augmented Reality Head-Mounted Displays," Proceedings of the 3rd Association for Computing Machinery (ACM) Symposium on Spatial User Interaction, Los Angeles, CA, USA, Aug. 8-9, 2015, pp. 89-98.

International Search Report and Written Opinion for International Application No. PCT/US2020/051763, mailed Feb. 3, 2021, 11 Pages.

International Search Report and Written Opinion for International Application No. PCT/US2022/032288, mailed Sep. 16, 2022, 11 pages.

Invitation to Pay Additional Fees for International Application No. PCT/US2021/044098, Nov. 3, 2021, 15 pages.

Mayer S., et al., "The Effect of Offset Correction and Cursor on Mid-Air Pointing in Real and Virtual Environments," Proceedings of the 2018 CHI Conference on Human Factors in Computing Systems, Montreal, QC, Canada, Apr. 21-26, 2018, pp. 1-13.

Melnick K., "Google Rolls out New AR Features for Its Lens App," May 28, 2019, Retrieved from the Internet: URL: https://vrscout.com/news/new-ar-features-google-lens/ , 3 pages.

Olwal A., et al., "The Flexible Pointer: An Interaction Technique for Selection in Augmented and Virtual Reality," Proceedings of ACM Symposium on User Interface Software and Technology (UIST), Vancouver, BC, Nov. 2-5, 2003, pp. 81-82.

Renner P., et al., "Ray Casting", Central Facility Labs [Online], [Retrieved on Apr. 7, 2020], 2 pages, Retrieved from the Internet: URL:https://www.techfak.uni-bielefeld.de/~tpfeiffe/lehre/VirtualReality/interaction/ray_casting.html.

Schweigert R., et al., "EyePointing: A Gaze-Based Selection Technique," Proceedings of Mensch and Computer, Hamburg, Germany, Sep. 8-11, 2019, pp. 719-723.

"Unity Gets Toolkit for Common AR/VR Interactions," Unity XR interaction Toolkit Preview [Online], Dec. 19, 2019 [Retrieved on Apr. 7, 2020], 1 page, Retrieved from the Internet: URL: http://youtu.be/ZPhv4qmT9EQ.

Game Ui Examples: "[VR] Half Life Alyx Menu/Settings/UI," Feb. 27, 2021, 2 pages, retrieved from the Internet URL: https://www.youtube.com/watch?v=-iNR-J2whJQt&t=7s.

International Search Report and Written Opinion for International Application No. PCT/US2023/033526, mailed Dec. 1, 2023, 13 pages.

\* cited by examiner

COORDINATION OF INTERACTIONS OF VIRTUAL OBJECTS

TECHNICAL FIELD

The present disclosure is directed to coordinating the interactions of virtual objects in an artificial reality environment.

BACKGROUND

Interactions with computing systems are often founded on a set of core concepts that define how users can interact with that computing system. For example, early operating systems provided textual interfaces to interact with a file directory. This was later built upon with the addition of "windowing" systems, whereby levels in the file directory and executing applications were displayed in multiple windows, each allocated a portion of a 2D display that was populated with content selected for that window (e.g., all the files from the same level in the directory, a graphical user interface generated by an application, menus or controls for the operating system, etc.). As computing form factors decreased in size and added integrated hardware capabilities (e.g., cameras, GPS, wireless antennas, etc.) the core concepts again evolved, moving to an "app" focus where each app encapsulated a capability of the computing system. New artificial reality systems have provided opportunities for further object and interaction models.

Existing artificial reality (XR) systems provide the virtual objects, such as 3D virtual objects and 2D panels, with which a user can interact in 3D space. Existing artificial reality systems have generally backed these virtual objects by extending the app core computing concept. For example, a user can instantiate these models by activating an app and telling the app to create the model, and using the model as an interface back to the app. Such existing artificial reality systems are highly unintuitive, inflexible, and difficult to create content for. For example, existing artificial reality systems typically limit virtual objects to be used by the app that created them, require each user to learn how to use the virtual objects created by each app, and make virtual object development labor intensive and prone to error. This approach makes it difficult for multiple disparate virtual object creators to allow their created virtual objects to interact with each other in the same artificial reality environment

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
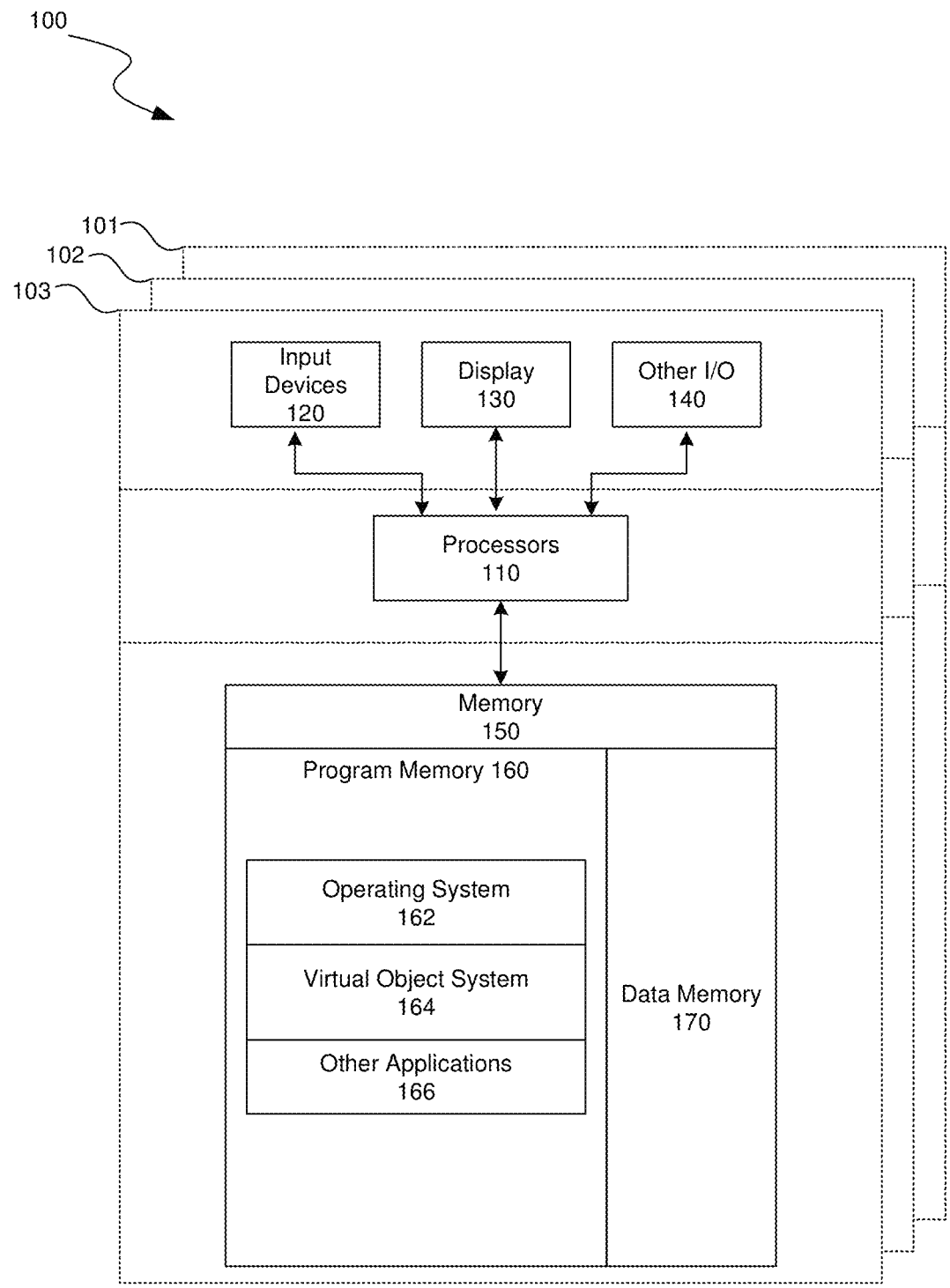
FIG. 1 is a block diagram illustrating an overview of devices on which some implementations of the present technology can operate.

Aspects of the present disclosure are directed to coordinating interactions of multiple virtual objects in an artificial reality environment. The coordination can be between the virtual objects, as well as between a virtual object and a shell application that hosts the artificial reality environment. The virtual objects can be created by disparate creators/entities, and therefore may initially have unknown properties to each other as well as to the shell application that operates the artificial reality environment. The coordination of the interactions involves learning about the unknown properties through a standard set of queries via APIs.

When a virtual object is instantiated, it can inherit properties from a virtual object class, and these can be overridden by the virtual object definition from the virtual object creator. When the virtual object is created, it can use API calls to register itself with the shell application. This registering can inform the shell application of some of the virtual object's properties (to be shared with other virtual objects with appropriate permissions). This registering can also include registering the virtual object to receive notifications of events or events of given types. Once instantiated, the virtual object can use the APIs to the shell application to query information about the environment (e.g., configuration of the real world and placement of other virtual objects), information about the user (e.g., user physical features such as position, pose, gestures, eye gaze direction etc.; user ID; current activity; social graph features, etc.), and specifics for other virtual objects (e.g., properties the other virtual object registered with the shell application when instantiated and for which the current virtual object has permissions to receive). In some cases, once the shell application informs a first virtual object about a second virtual object, the virtual objects may be able to directly communicate without going through the shell API. This may depend on the permission levels of the two virtual objects. As events occur, the shell application can push event notifications to the virtual objects registered for those events or types of events. Further, once the shell application informs a first virtual object about a second virtual object, the first virtual object may register for additional event notifications related to the second virtual object.

For example, a first creator can introduce a virtual object of a basketball hoop, and a second creator can introduce a virtual object of a basketball, both of which are to be hosted in the same artificial reality environment and need to interact with each other even if their properties are initially unknown to each other. Properties to be determined for both objects can include the size, weight and mass of the basketball, the size of the basketball hoop, the location of the basketball hoop within the artificial reality environment, etc. Once these properties are known, interactions or "events" such as the basketball being "shot" towards the hoop can be coordinated so that the hoop can determine whether the basketball passed through the hoop, resulting in a "point" being scored. These properties, and more, can be determined in response to queries between the virtual objects and/or the shell application. For example, the basketball hoop virtual object can register with the shell application to be notified of any objects whose position indicates that virtual object passes through the rim of the basketball hoop. Upon receiving a notification of such an event from the shell, referring to the basketball virtual object, the basketball hoop can query through the shell API the size of the basketball, and if it is smaller than the size of the rim, can invoke a corresponding rule, such as to increase a score counter.

As another example, a first creator can introduce a virtual object of a dog bowl containing dog food, and a second creator can introduce a virtual object of a dog, both of which are to be hosted in the same artificial reality environment and need to interact with each other even if their properties are initially unknown to each other. The dog virtual object can register itself with the shell to receive notifications of when a "food type" virtual object is within a threshold distance, at which point the dog virtual object can invoke a rule causing it to enter an "eating" state. The dog bowl virtual object can register itself with the shell to receive notifications of events indicating a "dog type" virtual object is within a threshold distance of the dog bowl. When that event occurs and the shell provides the corresponding notification, the dog bowl virtual object can query the dog virtual object to get the corresponding state. If the dog virtual object is in an eating state, the dog bowl virtual object can modify its internal state to reduce the amount of food it has and update display properties to show itself as less full. Thus, through the registering of events and additional querying to the shell and/or other virtual objects, in this example, the virtual objects can determine properties for each other such as the location of the dog bowl, the amount of food in the dog bowl, the amount of food that can be eaten by each bite of the dog, etc. Once these properties are known, the interactions can be coordinated so that, for example, the dog can begin eating the food, and when all of the food is eaten, the dog can knock the bowl over in "anger". These properties, and more, can be determined in response to queries between the virtual objects and/or the shell application.

In general, embodiments coordinate interactions between multiple virtual objects in an artificial reality environment. Embodiments receive, by a shell application in control of the artificial reality environment, a first virtual object, the first virtual object including properties, where the artificial reality environment is set in a real-world environment. Embodiments register, with the shell application, the properties of the first virtual object. Embodiments receive, by the shell application, one or more queries from a second virtual object and in response to the one or more queries, respond to the second virtual object with identified features of the real-world environment in which the artificial reality environment is set, and identifications of one or more virtual objects, in the artificial reality environment, including the first virtual object and the properties of first virtual object including an anchor point and a view state. The second virtual object uses the identification of the first virtual object to register for events related to the first virtual object and identify that an event related to the first virtual object (e.g., an interaction between the first and second virtual objects), for which the second virtual object is registered, occurred and, in response, notify the second virtual object of the event.

A "shell application" can be an operating system of an artificial reality device or another type of application that is in control of an artificial reality environment and/or able to create content in the artificial reality environment. In embodiments, the shell application defines the rules for how applications get access to hardware and artificial reality environment resources, what they have to do to create new virtual objects, how an application and virtual objects share information, and generally coordinate the operation of the artificial reality environment.

The shell application can create or receive data in any number of circumstances which it can log as an "event". In addition to events generated or that correspond to the interaction between virtual objects, other events can be generated for generally anything that can happen in the artificial reality environment. For example, events can correspond to the creation or placement of a real or virtual object; a detection of user movement or gesture (through body tracking or eye tracking), activity or selection; an incoming network event (e.g., message received, database change, social media occurrence, etc.); a change to a user profile; hardware utilizations, etc.

In some implementations, sets of virtual objects can be saved and later loaded on the same or a different artificial reality device as a scene. On a save command, the system can save current artificial reality environment details such as placement of virtual objects, virtual object states, and what the virtual objects have registered with the shell. On a load command, the system can bring the virtual objects into the artificial reality environment, registering them to the shell according to the saved shell registration information. Loading the virtual objects can include placing them in the artificial reality environment by: finding available locations in the new artificial reality environment that keep consistent spatial relationships (which may be scaled down if needed) between the virtual objects as they were saved and/or attempting to place the virtual objects on a same surface type they were attached to before (e.g., if the virtual object was on a vertical surface when saved, try to put it on a vertical surface when loaded). If an appropriate location for a virtual object cannot be found, the user can be notified to place that virtual object.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

In existing artificial reality systems, virtual objects are typically all created by the same entity that created the artificial reality system, so that all virtual objects have the same general attributes and interaction parameters and have known properties to both the creator of the artificial reality systems and all other objects. However, these systems generally cannot accommodate virtual objects with unknown properties, that are created by different entities than the creator of the artificial reality system. In contrast, embodiments create a framework for virtual objects to register with the artificial reality system and exchange properties and other parameters to allow the interactions between virtual objects to be coordinated.

Several implementations are discussed below in more detail in reference to the figures. FIG. 1 is a block diagram illustrating an overview of devices on which some implementations of the disclosed technology can operate. The devices can comprise hardware components of a computing system 100 that facilitate the coordination of interactions of multiple virtual objects in an artificial reality environment. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, virtual object system 164, and other application programs 166. Memory 150 can also include data memory 170 that can include virtual object properties, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
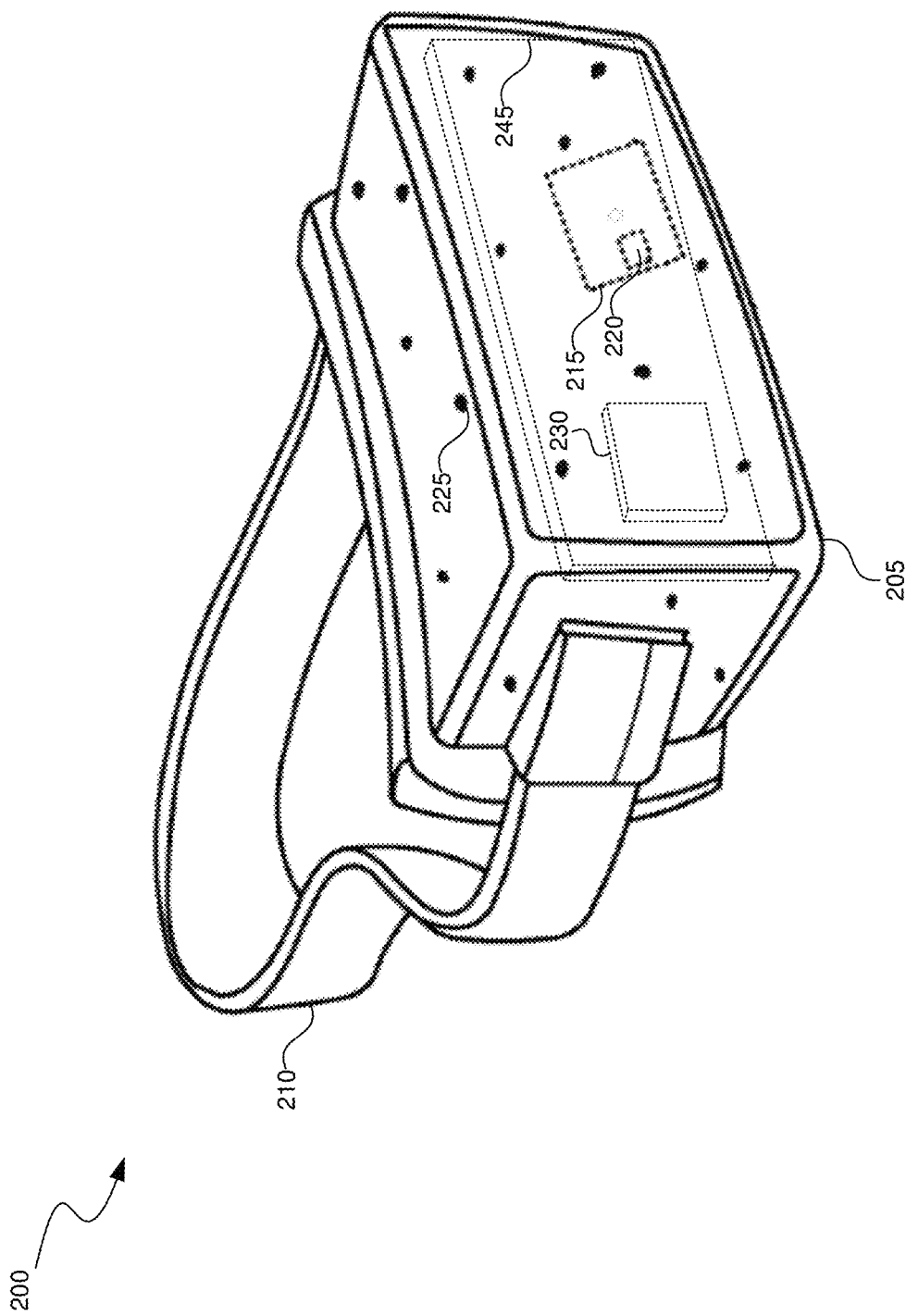
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in an artificial reality environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
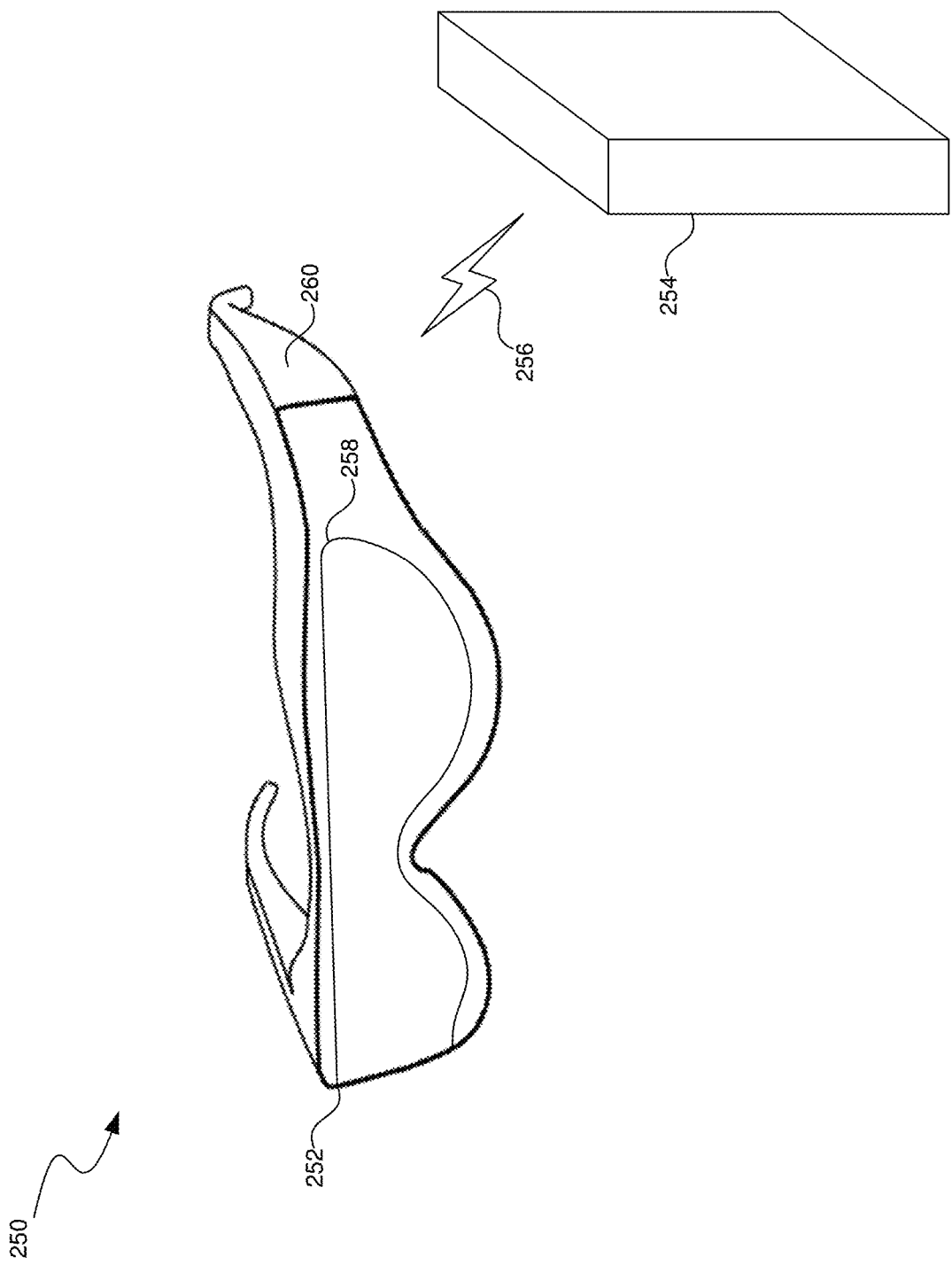
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
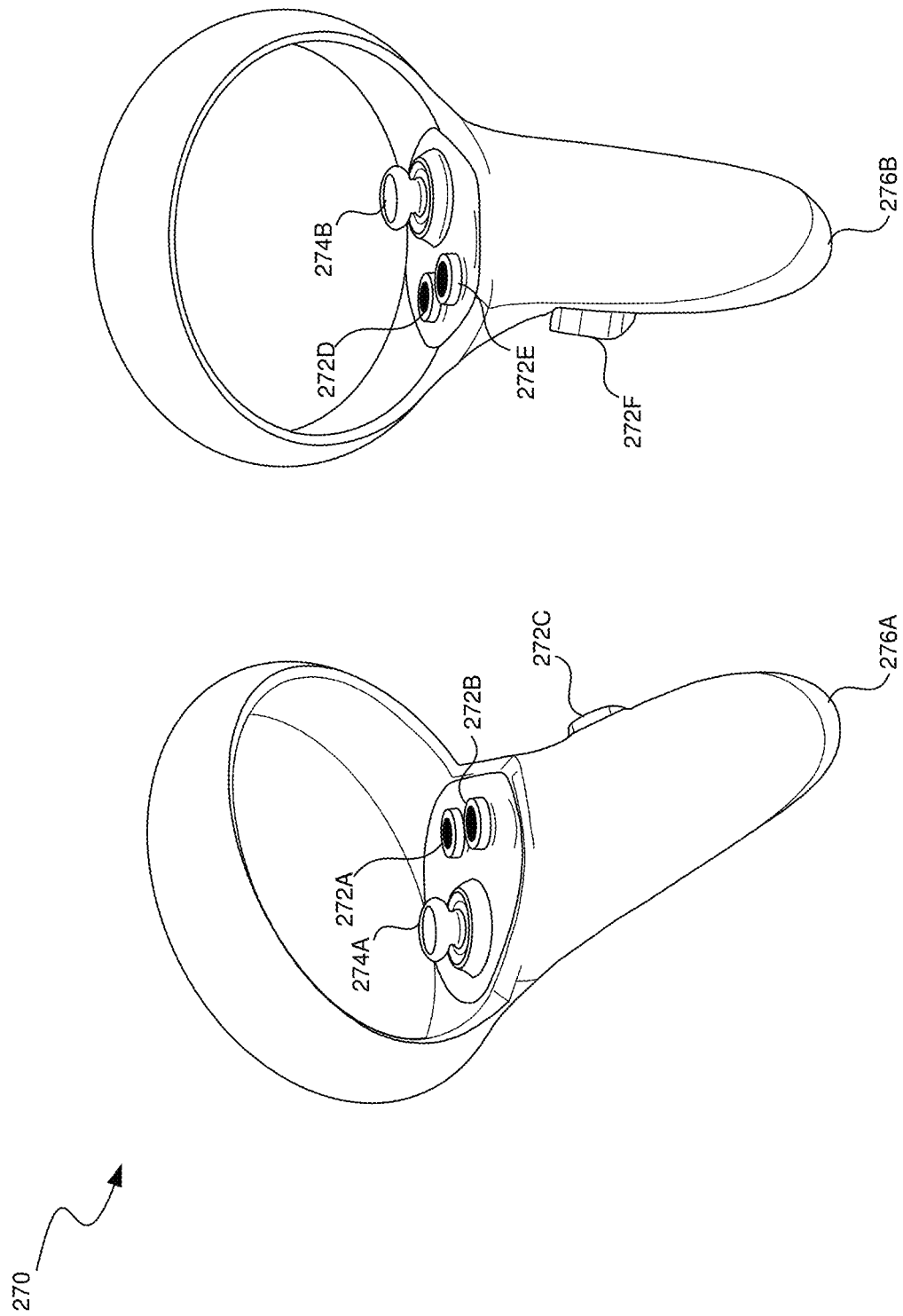
FIG. 2C is a wire diagram illustrating controllers which, in some implementations, a user can hold in one or both hands to interact with an artificial reality environment.

FIG. 2C illustrates controllers 270, which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc., to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. As another example, one or more light sources can illuminate either or both of the user's eyes and the HMD 200 or 250 can use eye-facing cameras to capture a reflection of this light to determine eye position (e.g., based on set of reflections around the user's cornea), modeling the user's eye and determining a gaze direction.

In some implementations, servers 210 and 220 can be used as part of a social network. The social network can maintain a social graph and perform various actions based on the social graph. A social graph can include a set of nodes (representing social networking system objects, also known as social objects) interconnected by edges (representing interactions, activity, or relatedness). A social networking system object can be a social networking system user, nonperson entity, content item, group, social networking system page, location, application, subject, concept representation or other social networking system object, e.g., a movie, a band, a book, etc. Content items can be any digital data such as text, images, audio, video, links, webpages, minutia (e.g. indicia provided from a client device such as emotion indicators, status text snippets, location indictors, etc.), or other multi-media. In various implementations, content items can be social network items or parts of social network items, such as posts, likes, mentions, news items, events, shares, comments, messages, other notifications, etc. Subjects and concepts, in the context of a social graph, comprise nodes that represent any person, place, thing, or idea.

A social networking system can enable a user to enter and display information related to the user's interests, age/date of birth, location (e.g. longitude/latitude, country, region, city, etc.), education information, life stage, relationship status, name, a model of devices typically used, languages identified as ones the user is facile with, occupation, contact information, or other demographic or biographical information in the user's profile. Any such information can be represented, in various implementations, by a node or edge between nodes in the social graph. A social networking system can enable a user to upload or create pictures, videos, documents, songs, or other content items, and can enable a user to create and schedule events. Content items can be represented, in various implementations, by a node or edge between nodes in the social graph.

A social networking system can enable a user to perform uploads or create content items, interact with content items or other users, express an interest or opinion, or perform other actions. A social networking system can provide various means to interact with non-user objects within the social networking system. Actions can be represented, in various implementations, by a node or edge between nodes in the social graph. For example, a user can form or join groups, or become a fan of a page or entity within the social networking system. In addition, a user can create, download, view, upload, link to, tag, edit, or play a social networking system object. A user can interact with social networking system objects outside of the context of the social networking system. For example, an article on a news web site might have a "like" button that users can click. In each of these instances, the interaction between the user and the object can be represented by an edge in the social graph connecting the node of the user to the node of the object. As another example, a user can use location detection functionality (such as a GPS receiver on a mobile device) to "check in" to a particular location, and an edge can connect the user's node with the location's node in the social graph.

A social networking system can provide a variety of communication channels to users. For example, a social networking system can enable a user to email, instant message, or text/SMS message, one or more other users. It can enable a user to post a message to the user's wall or profile or another user's wall or profile. It can enable a user to post a message to a group or a fan page. 11 can enable a user to comment on an image, wall post or other content item created or uploaded by the user or another user, And it can allow users to interact (e.g., via their personalized avatar) with objects or other avatars in an artificial reality environment, etc. In some embodiments, a user can post a status message to the user's profile indicating a current event, state of mind, thought, feeling, activity, or any other present-time relevant communication. A social networking system can enable users to communicate both within, and external to, the social networking system. For example, a first user can send a second user a message within the social networking system, an email through the social networking system, an email external to but originating from the social networking system, an instant message within the social networking system, an instant message external to but originating from the social networking system, provide voice or video messaging between users, or provide an artificial reality environment were users can communicate and interact via avatars or other digital representations of themselves. Further, a first user can comment on the profile page of a second user, or can comment on objects associated with a second user, e.g., content items uploaded by the second user.

Social networking systems enable users to associate themselves and establish connections with other users of the social networking system. When two users (e.g., social graph nodes) explicitly establish a social connection in the social networking system, they become "friends" (or, "connections") within the context of the social networking system. For example, a friend request from a "John Doe" to a "Jane Smith," which is accepted by "Jane Smith," is a social connection. The social connection can be an edge in the social graph. Being friends or being within a threshold number of friend edges on the social graph can allow users access to more information about each other than would otherwise be available to unconnected users. For example, being friends can allow a user to view another user's profile, to see another user's friends, or to view pictures of another user. Likewise, becoming friends within a social networking system can allow a user greater access to communicate with another user, e.g., by email (internal and external to the social networking system), instant message, text message, phone, or any other communicative interface. Being friends can allow a user access to view, comment on, download, endorse or otherwise interact with another user's uploaded content items. Establishing connections, accessing user information, communicating, and interacting within the context of the social networking system can be represented by an edge between the nodes representing two social networking system users.

In addition to explicitly establishing a connection in the social networking system, users with common characteristics can be considered connected (such as a soft or implicit connection) for the purposes of determining social context for use in determining the topic of communications. In some embodiments, users who belong to a common network are considered connected. For example, users who attend a common school, work for a common company, or belong to a common social networking system group can be considered connected. In some embodiments, users with common biographical characteristics are considered connected. For example, the geographic region users were born in or live in, the age of users, the gender of users and the relationship status of users can be used to determine whether users are connected. In some embodiments, users with common interests are considered connected. For example, users' movie preferences, music preferences, political views, religious views, or any other interest can be used to determine whether users are connected. In some embodiments, users who have taken a common action within the social networking system are considered connected. For example, users who endorse or recommend a common object, who comment on a common content item, or who RSVP to a common event can be considered connected. A social networking system can utilize a social graph to determine users who are connected with or are similar to a particular user in order to determine or evaluate the social context between the users. The social networking system can utilize such social context and common attributes to facilitate content distribution systems and content caching systems to predictably select content items for caching in cache appliances associated with specific social network accounts.

Figure 3:
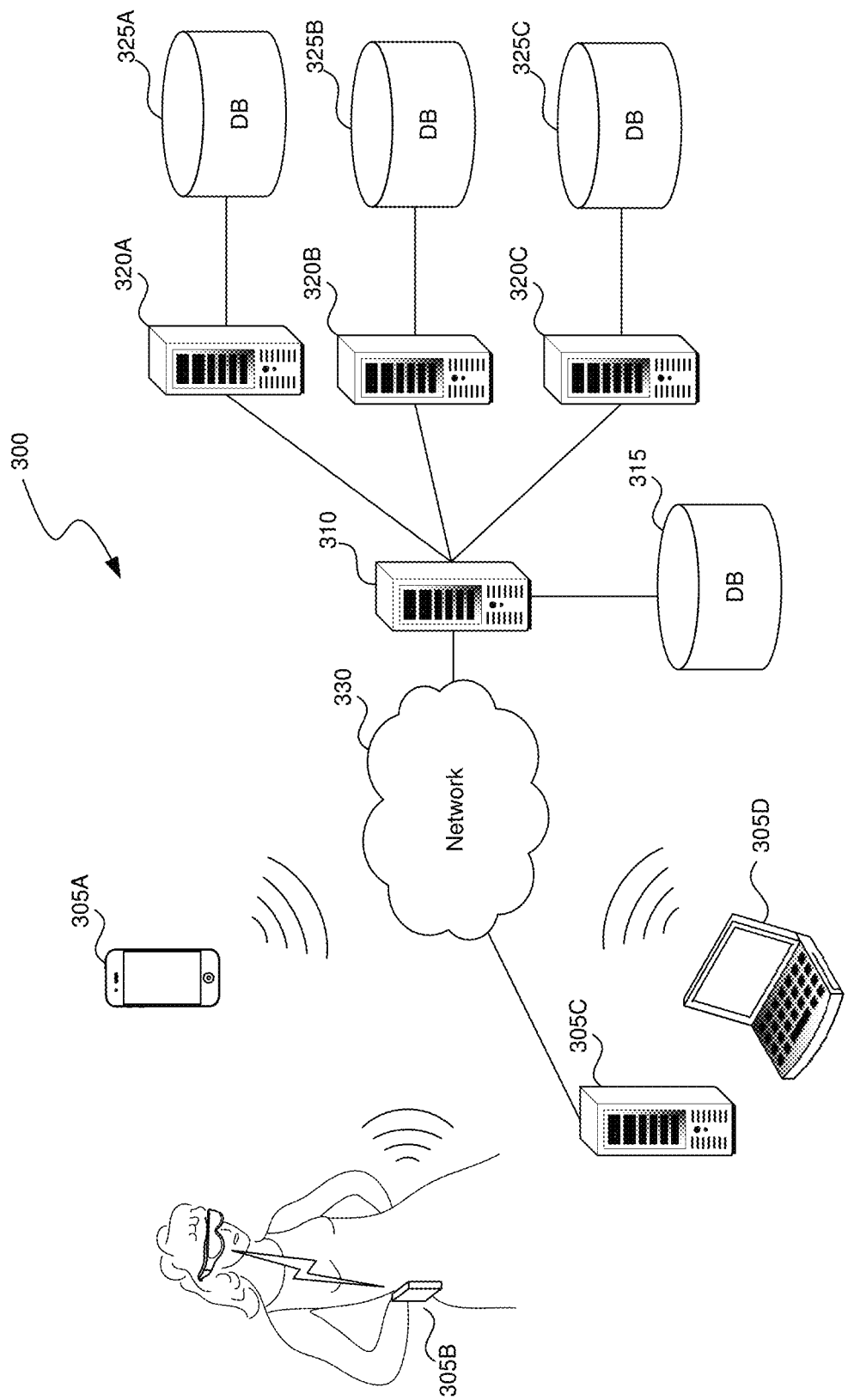
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
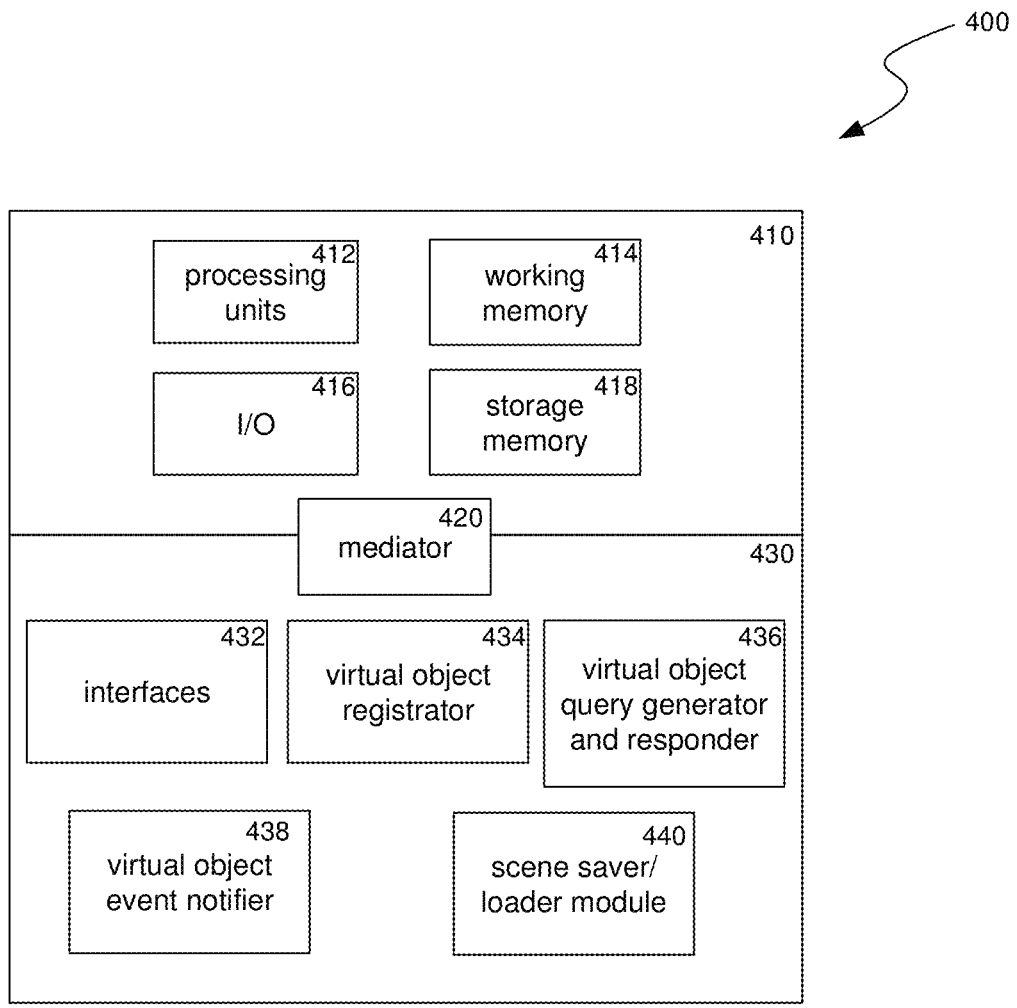
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for coordinating interactions of virtual objects. Specialized components 430 can include virtual object registrator 434, virtual object query generator and responder 436, virtual object event notifier 438, scene saver/loader module 440, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

Virtual object registrator 434 can register each virtual object when it enters an artificial reality environment. The registration can be done by the shell application of the artificial reality environment and includes the virtual object providing, for example, its corresponding properties to the shell application. The properties can include physical properties such as weight, mass, collision volume, friction or material, and other properties such as interaction rights (i.e., aspects of the virtual object that other virtual objects can access or change). Additional details on instantiating and registering a virtual object with a shell application are provided below in relation to blocks 502 and 504 of FIG. 5.

Virtual object query generator and responder 436 receives and generates queries from the virtual objects that enter or are otherwise present in the artificial reality environment. The queries can be from one virtual object to another virtual object, or from a virtual object to the shell application. Responses to queries can be sent from the shell application or from the virtual object that receives the queries. Additional details on responding to queries to inform virtual objects about the artificial reality environment and to coordinate between virtual objects are provided below in relation to blocks 506, 508, 510 and 512 of FIG. 5.

Virtual object event notifier 438 monitors for events and, in response to an event, notifies a respective virtual object. For example, an event can be an interaction between a first virtual object and a second virtual object. In response to the event, the virtual objects may update properties. Additional details on registering a virtual object for events and notifying the virtual objects of events for which they are registered are provided below in relation to blocks 504, 514, and 516 of FIG. 5.

Scene saver/loader module 440 allows for sets of virtual objects to be saved, and later loaded on the same or a different artificial reality device as a scene. Additional details on saving and loading sets of virtual objects are provided below in relation to FIGS. 6A, and FIG. 6B.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
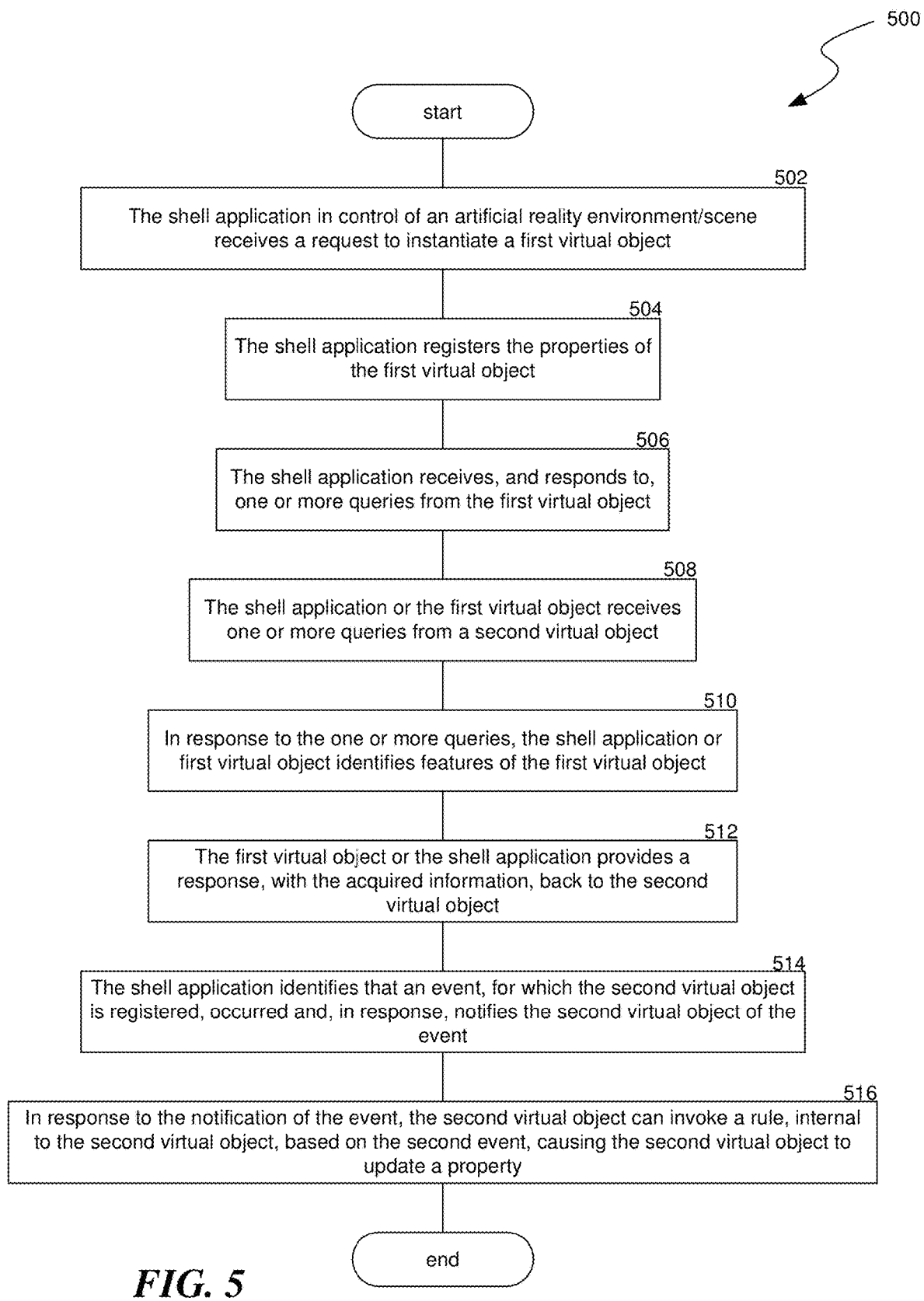
FIG. 5 is a flow diagram illustrating a process used in some implementations of the present technology for coordinating the interactions of virtual objects in an artificial reality environment.

FIG. 5 is a flow diagram illustrating a process 500 used in some implementations for coordinating the interactions of virtual objects in an artificial reality environment. In some implementations, process 500 can be performed by a shell application on an artificial reality device in control of an artificial reality environment. For example, process 500 can be performed when the artificial reality environment is initialized, as a response to a virtual object initially appearing in the artificial reality environment, or in response to interactions with other virtual objects in the environment.

At block 502, the shell application in control of an artificial reality environment/scene receives a request to instantiate a first virtual object. For example, an application can provide a manifest to the shell application specifying details of the virtual object and the shell can respond by providing access (e.g., a handle) to a volume in the artificial reality environment the application can write into to create the virtual object. In some cases, the manifest can specify a class of virtual objects with properties such as a set of physics to follow, rules for combining an interacting with other virtual objects, display states and templates, etc. The creator of the first virtual object can override these inherited properties by specifying alternate properties in the manifest. Additional details on instantiating a virtual object, or "augment" in an artificial reality environment are provided in U.S. Pat. No. 11,176,755 titled "ARTIFICIAL REALITY AUGMENTS AND SURFACES," which is hereby incorporated by reference in its entirety. In some cases, the first virtual object can be instantiated by a separate process and provided to be received by process 500, whereby properties of the first virtual object are provided to process 500. In various implementations, the first virtual object can be received when it first enters the environment at the initiation of the environment, or after the environment has been established.

At block 504, the shell application registers the properties of the first virtual object, e.g., specified in the request to register the first virtual object or in the request to create the first virtual object. Examples of the properties include physical properties such as weight, mass, collision volume, friction, material, view state, available interfaces or controls, included data objects, existing tie-ins to other platforms (e.g., social media, messaging, cloud services, etc.), location or anchor point, etc. Examples of properties further include interaction rights specifying what aspects of the first virtual object another virtual object can access or change (e.g., rights that other virtual objects or applications need to read or set properties of the first virtual object). The shell application can also register the first virtual object to receive one or more events, as defined in the request to register the first virtual object or in the request to create the first virtual object. As a first example, a manifest defined for the first virtual object can indicate a category of events for which the shell should notify the first virtual object, such as any event indicating an incoming message from a messaging platform or any event categorized as a movement of another object in a defined area. As a second example, the manifest can indicate specific events for which the shell should notify the first virtual object, such as a user making a particular gesture or coming within four feet of the first virtual object, an object of a "photo" type coming into contact with the first virtual object, or the first virtual object being moved onto a flat, vertical surface.

At block 506, the shell application receives one or more queries from the first virtual object. The queries can be received via an API provided by the shell application and can request to access information such as an arrangement of the artificial reality environment (e.g., identified surfaces, objects, placement of other virtual objects, etc.) and their basic properties (e.g., object ID, type, what type of surface or anchor point the virtual object is attached to, a view state of the virtual object—i.e., how is the user viewing the virtual object, etc.) and/or information on one or more users in the artificial reality environment (e.g., user identifiers, positions, poses, gestures, eye gaze direction, current activity, social graph features, etc.) The shell application can respond to the one or more queries with the requested information—e.g., providing the information for which the first virtual object has rights to receive.

At block 508, the shell application or the first virtual object receives one or more queries from a second virtual object. The second virtual object is also in the artificial reality environment and, similar to the first virtual object, has previously registered with the shell application. In embodiments, the first virtual object is created by a first entity and the second virtual object is created by a second entity that is different from the first entity. The queries can be received via an API provided by the shell application or an API provided by the first virtual object. For example, the second virtual object can have performed a query, via the APIs of the shell application—similar to the query the first virtual object performed at block 506, to get a list of virtual objects in the artificial reality environment. The second virtual object can then have sent the one or more queries received at block 508 (directly to the first virtual object or via the shell APIs) to get additional properties of one of the listed virtual objects.

At block 510, in response to the one or more queries, the shell application or first virtual object identifies features of the first virtual object. Depending on the type of query, the shell application or first virtual object can retrieve a specific virtual object property requested or, for a general request, can generate a data structure for the first virtual object specifying all the properties of the first virtual object that the second virtual object is authorized to receive. Examples of such virtual object properties can include, e.g., what type of surface or anchor point the first virtual object is attached to, and a view state of the first virtual object (i.e., how is the user viewing the first virtual object), data objects or models included in the first virtual object, state variable for the first virtual object, etc. Examples of view states include a minimized view state showing just an icon for the virtual object, a flat panel view state, a 3D model view state, and a view state with controls showing quick actions. The view states can be set based on whether the virtual object is being held by a user, is on a flat surface, is on a vertical surface, or is anchored to a point in the air. At block 512, the first virtual object or the shell application can provide a response, with the acquired information, back to the second virtual object.

In some implementations, instead of the one or more queries, at block 510 process 500 can receive a request to register the second virtual object for an event related to the first virtual object. For example, the second virtual object can have performed the initial request from block 506 to get a list of virtual objects in the artificial reality environment. Having identified a virtual object relevant to the second virtual object, the second virtual object can register to get all events triggered by the first virtual object or specific events or event types related to the first virtual object.

At block 514, the shell application identifies that an event, for which the second virtual object is registered, occurred and, in response, notifies the second virtual object of the event. (Process 500 may also notify other virtual objects registered for the same event.) One example of an event is an interaction of the first virtual object with a second virtual object (e.g., when these virtual objects are brought together or within a threshold distance of one another), such as where the first virtual object is a basketball and the second virtual object is a basketball hoop, and the event is the basketball passing through the hoop or being shot towards the hoop. The event can indicate a position of the first virtual object in relation to the second virtual object. As discussed above, events can be triggered for anything that can happen in the artificial reality environment, such as interactions between virtual objects; creation, removal, or placement of a real or virtual object; a detection of user movement or gesture; identification of a user activity or selection; an incoming network event (e.g., message received, database change, social media occurrence, etc.); hardware utilizations (e.g., a picture taken, a processor, memory, or battery state, a change detected by a motion sensor, etc., a change to a user profile; etc.

At block 516, in response to the notification of the event, the second virtual object can invoke a rule, internal to the second virtual object, based on the second event, causing the second virtual object to update a property. For example, the second virtual object can update a property in response to the first virtual object's position. In the basketball example, the rule can be that if the ball passes through the hoop, a point is "scored". Process 500 can continue to receive queries and registration requests, identify events, and coordinate interactions between virtual objects while the shell is maintaining the artificial reality environment. Process 500 can then end.

Figure 6B:
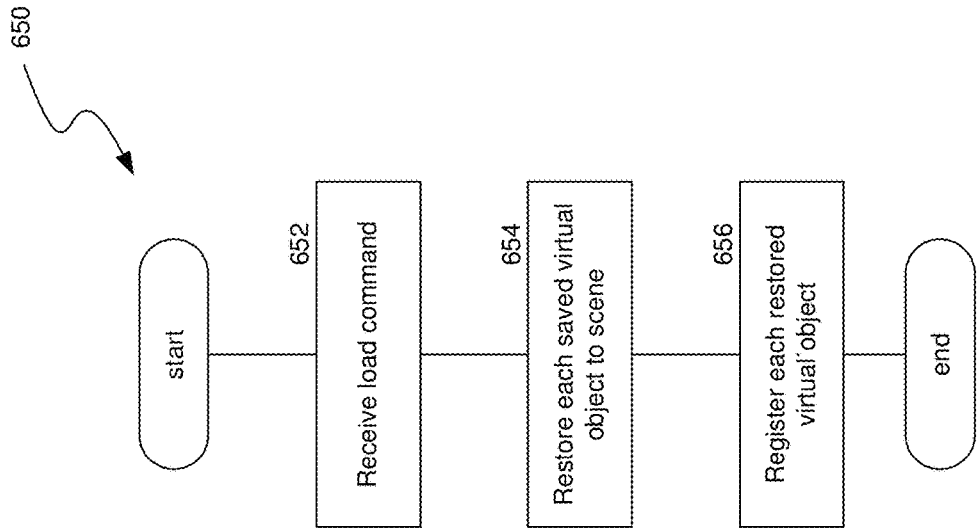
FIG. 6B is a flow diagram illustrating a process used in some implementations of the present technology for loading an artificial reality scene.
Figure 6A:
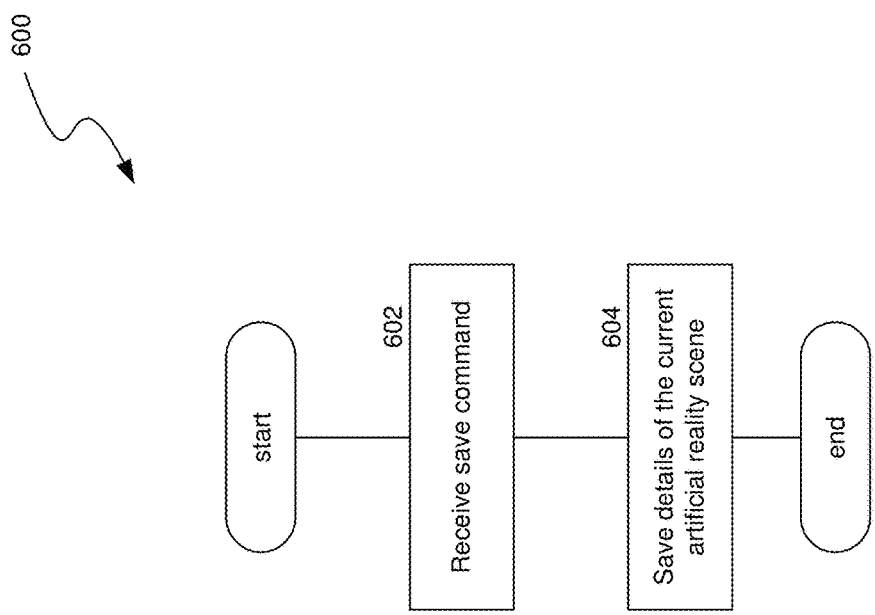
FIG. 6A is a flow diagram illustrating a process used in some implementations of the present technology for saving an artificial reality scene.

FIG. 6A is a flow diagram illustrating a process 600 used in some implementations for saving an artificial reality scene. Process 600 can be performed on an artificial reality device or a server system supporting such an artificial reality device.

At block 602, a save command is received. The save command can be received in response to a user gesture or selection (e.g., a selection of ending a virtual session or restarting a virtual session, a selection of a "save to scene" control in relation to a selected set of virtual object or all virtual objects in an artificial reality environment, a voice command, etc.), or automatically generated in response to an event (e.g., when a new application takes over the artificial reality environment, the virtual objects to be closed can be saved to a scene).

At block 604, the details are saved for the virtual objects to be saved as a scene, e.g., details on each virtual object that is present in the artificial reality environment or a selected subset of such objects. The saved details can include, e.g., the placement of virtual objects (e.g., specific locations and/or orientations, spatial relationships to each other, anchor point type, etc.), the virtual object states (e.g., view state, current data objects, internal variables, connections to other systems, etc.), and what the virtual objects have registered with the shell application such as events and details registered via block 504 of FIG. 5. These saved details can be packaged with data for the virtual objects or with references to the virtual objects, to allow the virtual objects to be later instantiated, on the same or a different artificial reality device, using the saved details. For example, the package can be saved locally, shared directly to another artificial reality device, or provided to a cloud repository for the same or another artificial reality device to later access and load. Process 600 can then end.

FIG. 6B is a flow diagram illustrating a process 650 used in some implementations for loading an artificial reality scene. Processes 600 and 650 can be implemented on the same artificial reality device or on different artificial reality devices (or on a server system supporting such an artificial reality device).

At block 652, a load command is received. The load command can be received in response to a user gesture or selection (e.g., a selection of restarting an artificial reality environment, a selection of a previously saved scene package saved locally, received as a message, or accessed through a cloud repository), the initial powering on of a virtual reality device, or automatically generated in response to an event.

At block 654, each saved virtual object is restored to the scene, including properly placing each virtual object within the scene. Placing a virtual object can include finding available locations in the new/restored artificial reality environment that keep consistent spatial relationships, which may be scaled down if needed, between the virtual objects as they were saved and/or attempting to place the virtual objects on a same surface type or anchor point type they were attached to when saved. For example, if a virtual object was on a vertical surface when saved, process 650 can look for a vertical surface in the new artificial reality environment that maintains a similar spatial relationship to other saved virtual objects (e.g., within a threshold deviance) when loaded. If an appropriate location for a virtual object cannot be found (e.g., the system cannot place objects in a similar special configuration and/or cannot find surfaces or anchor points of the same type in a similar spatial configuration), process 650 can use default locations such as the closest space that can take the object and/or the user can be notified to place that virtual object.

At block 656, each restored virtual object is registered to the shell application according to the saved shell registration information from block 604 of FIG. 6A. For example, the details of the virtual objects can be registered to the shell and any events the virtual object was registered to receive (which can include validating that the events are related to objects in the new artificial reality environment or can be triggered in the new artificial reality environment) can be reestablished. Process 650 can then end.

Figure 7:
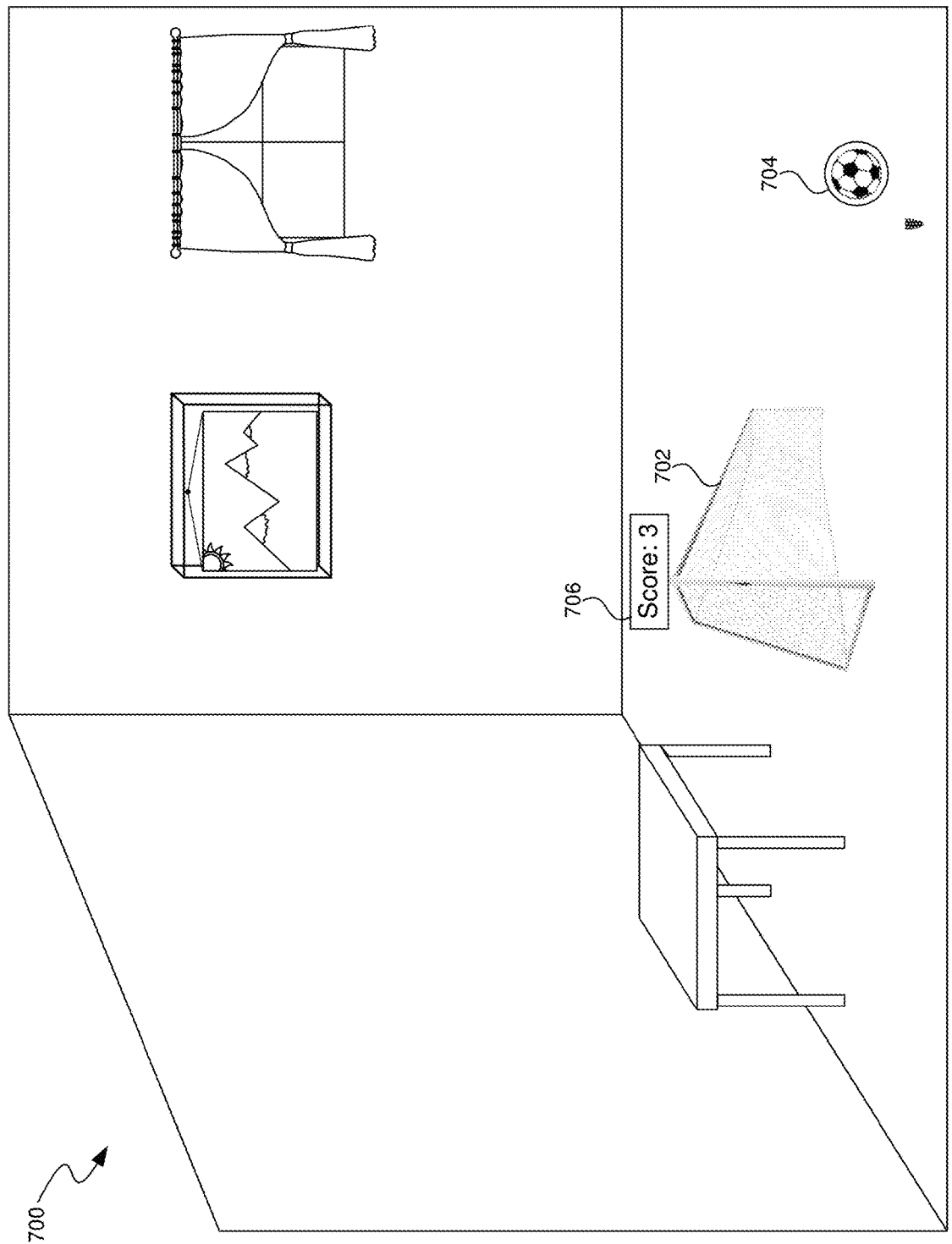
FIG. 7 is a conceptual diagram illustrating an example that includes multiple virtual objects.

FIG. 7 is a conceptual diagram illustrating an example 700 that includes multiple virtual objects, including a first virtual object 702 that is a soccer goal (defined by a first entity), and a second virtual object 704 that is a soccer ball (defined by a second entity different from the first entity). Information about the first virtual object may not be initially programmed into the second virtual object, and vice versa.

Per process 500, object 702 and object 704, when initialized, can register for events with the shell application. For example, object 702 can register to be notified of events of other objects coming within the area defined inside the goal. A user, via an avatar (not shown) or other means, can "kick" object 704 towards object 702, causing it to enter the defined goal area, triggering the event. The shell application will, in response to the event and the registration of object 704 being registered for that event, notify object 702 of the event, including an identification of the object 704. Object 702 can then query object 704, using the provided identification, for information such as the size of the object to make sure it fits within the goal area and is of a type "ball," to determine if the kick resulted in a "score" according to an internal rule of object 702—in which case object 702 updates its score tracker 706.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method of coordinating interactions between multiple virtual objects in an artificial reality environment, the method comprising:
   receiving, by a shell application in control of the artificial reality environment, an indication of a first virtual object, the first virtual object comprising first properties, wherein the artificial reality environment is set in a real-world environment;
   registering, with the shell application, the first properties of the first virtual object;
   receiving, by the shell application, one or more queries from a second virtual object;
   in response to the one or more queries, responding to the second virtual object with:
      identified features of the real-world environment in which the artificial reality environment is set, and
      identifications of one or more virtual objects, in the artificial reality environment, including the first virtual object and first properties of the first virtual object, the first properties comprising an anchor point and a view state, wherein the second virtual object uses the identification of the first virtual object to register for events related to the first virtual object; and
   identifying that an event related to the first virtual object, for which the second virtual object is registered, occurred and, in response, notifying the second virtual object of the event,
   wherein the event indicates A) a change in position of the first virtual object relative to the second virtual object and/or B) an interaction of the first virtual object with the second virtual object, and
   wherein the second virtual object invokes a rule, of the second virtual object, based on notification of the event, thereby causing the second virtual object to modify its internal state and update a display property relative to the event.

2. The method of claim 1, wherein the first virtual object is created by a first entity and the second virtual object is created by a second entity that is different from the first entity.

3. The method of claim 1, wherein the second virtual object sends one or more second queries from the second virtual object to the first virtual object requesting second properties of the first virtual object.

4. The method of claim 3, wherein the one or more second queries from the second virtual object to the first virtual object are via an API provided by the first virtual object.

5. The method of claim 1, wherein the receiving the one or more queries from the second virtual object is via an API provided by the shell application.

6. The method of claim 1, wherein the first properties further include physical properties of the first virtual object comprising one or more of weight, mass, collision volume, friction or material.

7. The method of claim 1, wherein the first properties further include interaction rights specifying what aspects of the first virtual object the second virtual object can access or change.

8. The method of claim 1, wherein the responding to the second virtual object further comprises responding with one or more aspects of a viewing user.

9. The method of claim 1, wherein the view state comprises one or more of: a minimized view state where the first virtual object is represented as an icon for the first virtual object, a vertical surface view state where the first virtual object is represented as a flat panel, or a maximized view state where the first virtual object is represented as a 3D model view state.

10. The method of claim 1, wherein the event indicates the change in position of the first virtual object in relation to the second virtual object.

11. The method of claim 1, wherein the rule causes the second virtual object to update the display property in response to the changed in position of the first virtual object.

12. The method of claim 1, further comprising saving a virtual scene comprising saving, for each of the one or more virtual objects, a corresponding state and/or anchor position.

13. The method of claim 12, wherein the saved virtual scene is loaded by an artificial reality device by recalling each of the one or more virtual objects and setting its saved state and/or anchor position.

14. A computer-readable storage medium storing instructions that, when executed by a computing system, cause the computing system to perform a process for coordinating interactions between multiple virtual objects in an artificial reality environment, the process comprising:
  receiving, by a shell application in control of the artificial reality environment, an indication of a first virtual object;
  registering, with the shell application, first properties of the first virtual object;
  receiving, by the shell application, one or more queries from a second virtual object;
  in response to the one or more queries, responding to the second virtual object with:
    identified features in relation to the artificial reality environment, and
    identifications of one or more virtual objects, in the artificial reality environment, including the first virtual object and first properties of the first virtual object, wherein the second virtual object uses the identification of the first virtual object to register for events related to the first virtual object; and
  identifying that an event related to the first virtual object, for which the second virtual object is registered, occurred and, in response, notifying the second virtual object of the event,
  wherein the event indicates A) a change in position of the first virtual object relative to the second virtual object and/or B) an interaction of the first virtual object with the second virtual object, and
  wherein the second virtual object invokes a rule, of the second virtual object, based on notification of the event, thereby causing the second virtual object to modify its internal state and update a display property relative to the event.

15. The computer-readable storage medium of claim 14, wherein the first virtual object is created based on a first definition from a first entity and the second virtual object is created based on a second definition from a second entity that is different from the first entity.

16. The computer-readable storage medium of claim 14, wherein the second virtual object sends one or more second queries from the second virtual object to the first virtual object requesting second properties of the first virtual object.

17. The computer-readable storage medium of claim 16, wherein the one or more second queries from the second virtual object to the first virtual object are via an API provided by the first virtual object.

18. The computer-readable storage medium of claim 14, wherein the receiving the one or more queries from the second virtual object is via an API provided by the shell application.

19. A computing system for coordinating interactions between multiple virtual objects in an artificial reality environment, the computing system comprising:
  one or more processors; and
  one or more memories storing instructions that, when executed by the one or more processors, cause the computing system to perform a process comprising:
    receiving, by a shell application in control of the artificial reality environment, an indication of a first virtual object;
    registering, with the shell application, first properties of the first virtual object;
    receiving, by the shell application, one or more queries from a second virtual object;
    in response to the one or more queries, responding to the second virtual object with:
      identified features in relation to the artificial reality environment, and
      identifications of one or more virtual objects, in the artificial reality environment, including the first virtual object and first properties of the first virtual object, wherein the second virtual object uses the identification of the first virtual object to register for events related to the first virtual object; and
    identifying that an event related to the first virtual object, for which the second virtual object is registered, occurred and, in response, notifying the second virtual object of the event,
    wherein the event indicates A) a change in position of the first virtual object relative to the second virtual object and/or B) an interaction of the first virtual object with the second virtual object, and
    wherein the second virtual object invokes a rule, internal to the second virtual object, based on notification of the event, thereby causing the second virtual object to modify its internal state and update a display property relative to the event.

20. The system of claim 19, wherein the first virtual object is created based on a first definition from a first entity and the second virtual object is created based on a second definition from a second entity that is different from the first entity.

* * * * *